(No Model.)
E. DEWERTH.
DOUGH CUTTING MACHINE.
No. 521,140. Patented June 5, 1894.
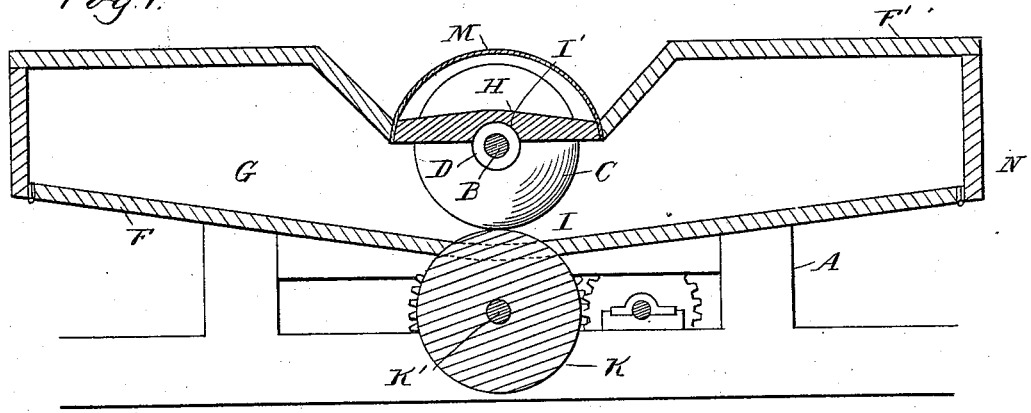
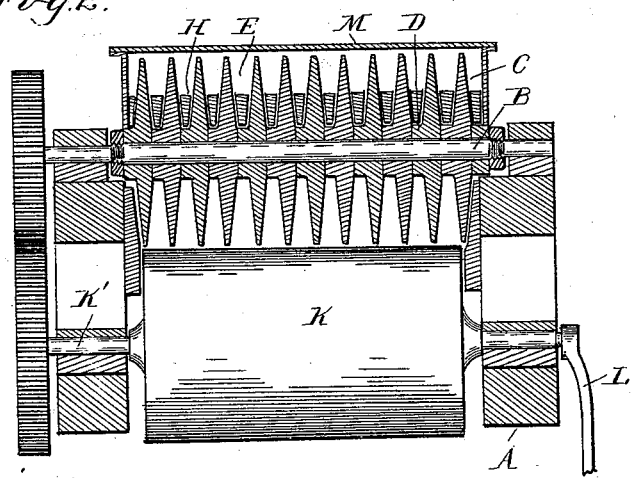
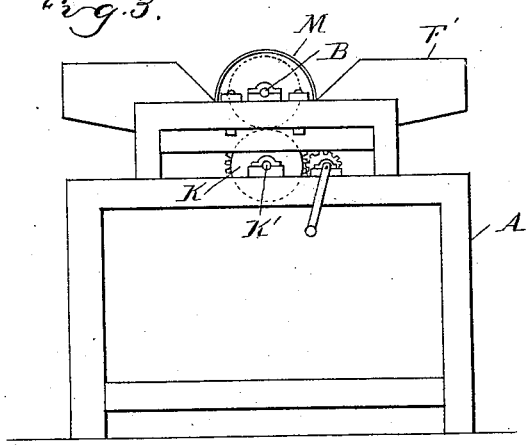
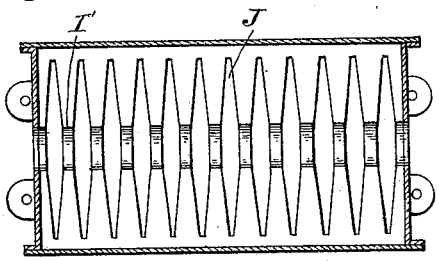
Witnesses
A. L. Kobby
M. B. Dogherty
Inventor
Emil Dewerth
By Thos. Sprague & Son Attys.

UNITED STATES PATENT OFFICE.

EMIL DEWERTH, OF DETROIT, MICHIGAN.

DOUGH-CUTTING MACHINE.

SPECIFICATION forming part of Letters Patent No. 521,140, dated June 5, 1894.

Application filed January 2, 1894. Serial No. 495,352. (No model.)

*To all whom it may concern:*

Be it known that I, EMIL DEWERTH, a subject of the Emperor of Germany, residing at Detroit, in the county of Wayne and State of Michigan, have invented certain new and useful Improvements in Dough-Cutting Machines, of which the following is a specification, reference being had therein to the accompanying drawings.

The invention consists in the construction of a series of disk-cutters, a scraper block or scraper bars arranged to scrape off such material as might adhere to the cutters in use. Further in the combination of the cutters with a rotary feed drum; in the construction of the feed tables, and further in the peculiar construction, arrangement and combination of the various parts, all as more fully hereinafter described.

In the drawings, Figure 1 is a vertical, central, longitudinal, section through my improved machine. Fig. 2 is a vertical, central, cross-section. Fig. 3 is a side elevation. Fig. 4 is a bottom plan of the scraper block detached.

The machine is intended to cut and work into a plastic condition that class of dough which is used in making honey cake, or other sweet goods. In making these cakes after the dough is mixed with the saccharine matter, it is allowed to stand for some time and, the sugar becoming crystallized, makes it necessary to cut it up and work it, to render it plastic for the further operations.

A is the frame.

B is a shaft journaled in suitable boxes on the frame, and having secured to it a series of circular disk cutters C. These cutters are shaped like a tapering or convexo convex lens having a circular hub D on one side, serving to space or separate them when secured together on the shaft. The cutters are secured to the shaft in any suitable manner, and when thus secured (as shown in Fig. 2) there remains between them the spaces E which contract from the periphery to the hub of the cutters.

F are inclined feed tables on opposite sides of the cutters, and inclining from the outer ends downward toward the cutters. These tables are provided with covers F' forming on opposite sides of the cutters the feed troughs or feed chutes G. Between the cutters and spanning the space between the feed troughs, I arrange a slotted platen H, the lower edge of which is substantially in line with the center line of the cutters or thereabout, and forms a top or pressure plate for the contracted throat I between the two feed chutes. The platen is provided centrally with the curved bearing I' adapted to fit over the hubs of the cutters, and the cutters themselves are ground into the slots J, so as to make a perfectly tight fit. The platen is supported upon the frame in any suitable manner, such for instance as by brackets or ears at the ends. Below the cutters and projecting a slight distance into the throat I is a drum K, upon a shaft K' journaled in suitable bearings in the frame. The cutter shaft and the shaft K' of the drum are geared together in any suitable manner, preferably to have the same speed and are driven from any suitable source of power, such for instance the crank handle L. The cutters I preferably cover by means of a hood M and the feed chutes are provided at their ends with doors N.

The parts being thus constructed their operation is as follows: The material is fed into the feed chute at one side and fed against the cutters, which are put in motion from the crank L. The material is fed through the throat I and in passing therethrough will be cut and worked into a plastic condition by the cutters. It is evident that the material in being forced from the cutting edges of the cutters toward the hub, (as will be the case if enough material is fed into the chute,) will be compressed and as the material sticks more or less to the cutters it will be carried forward and forced against the platen, until the accumulated material in the rear will force it out into the feed trough on the opposite side. The material when all fed through may be fed back again by simply reversing the motion of the disks and feed drum, by turning the crank L in an opposite direction, and thus without handling the material, it may be fed back and forth until it has reached the desired plastic condition required for the further operations.

I claim—

1. The combination of the frame, a series of disk cutters secured upon a common shaft, feed tables on opposite sides of the cutters, and a platen slotted to receive and extending on opposite sides of the cutters and forming the top for the space in which the lower portion of the cutters operate, substantially as described.

2. The combination of the frame, the driven cutter shaft, a series of tapering disk cutters secured thereon, inclined feed tables on opposite sides of the cutters, a platen, slotted to receive the upper portion of the cutters, and forming the top for the space in which the lower portion of the cutters operate, and a rotary feed drum below the cutters, substantially as described.

3. In a dough cutter, the combination with the frame, of inclined feed tables thereon, a series of circular cutting disks arranged centrally between the tables, a shaft on which the disks are mounted, a slotted platen through which the disks pass, and curved bearing formed in the platen, substantially as described.

In testimony whereof I affix my signature in presence of two witnesses.

EMIL DEWERTH.

Witnesses:
CARL HIMAN,
FERDINAND J. BERSCHBACH.